United States Patent
Scholz et al.

(10) Patent No.: US 7,393,556 B2
(45) Date of Patent: Jul. 1, 2008

(54) PROCESS FOR THE PRODUCTION OF A MULTILAYER VEHICLE REPAIR COATING

(75) Inventors: Roland Scholz, Kuerten (DE); Harald Paulussen, Molenbeel-Wersbeek (BE); Andrew Duda, Gladbeck (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 17 days.

(21) Appl. No.: 11/268,019

(22) Filed: Nov. 7, 2005

(65) Prior Publication Data

US 2007/0104863 A1 May 10, 2007

(51) Int. Cl.
*B05D 1/36* (2006.01)
*B05D 1/38* (2006.01)
*B05D 7/14* (2006.01)
*B05D 3/06* (2006.01)

(52) U.S. Cl. .................. 427/140; 427/258; 427/384; 427/388.4; 427/407.1; 427/419.1

(58) Field of Classification Search .................. None
See application file for complete search history.

(56) References Cited

U.S. PATENT DOCUMENTS

| 5,556,912 A | 9/1996 | Brock et al. |
| 5,683,745 A | 11/1997 | Liedtke et al. |
| 5,871,809 A | 2/1999 | Liedtke et al. |
| 6,093,497 A * | 7/2000 | Wiemann et al. ........... 428/500 |
| 6,599,172 B2 * | 7/2003 | Nagasawa et al. ............. 451/28 |

FOREIGN PATENT DOCUMENTS

| EP | 0661321 A1 | 7/1995 |
| EP | 0719185 A1 | 7/1996 |
| WO | WO 95/14540 A | 6/1995 |

* cited by examiner

*Primary Examiner*—William Phillip Fletcher, III

(57) ABSTRACT

A process for multilayer repair coating, comprising the following steps:
applying a first base coat layer of a conventional, water-borne base coat I containing at least one special effect pigment, applying a second base coat layer of a water-borne base coat II onto the resultant coating, wherein the water-borne base coat II for producing the second base coat layer is feathered out into the zones bordering the repair coating, and wherein this water-borne base coat II comprises
  A) at least one water-dilutable binder,
  B) at least one special effect pigment,
  C) at least one matting agent,
  D) water and
  E) optionally, conventional coating additives and/or organic solvents,
with the proviso that the water-borne base coat II contains the at least one special effect pigment in a quantity of 25-75 wt. %, relative to the quantity of the at least one special effect pigment contained in water-borne base coat I, applying a clear coat layer of a transparent clear coat onto the resultant coating and curing the coating applied.

17 Claims, No Drawings

PROCESS FOR THE PRODUCTION OF A MULTILAYER VEHICLE REPAIR COATING

FIELD OF THE INVENTION

The invention relates to a process for the production of a multilayer repair coating using water-borne base coats, in particular usable for spot repairs in vehicle repair coating.

DESCRIPTION OF RELATED ART

On environmental grounds, water-based coatings are ever more frequently being used as vehicle repair coatings. However, the coatings produced using aqueous coating compositions do not in all respects achieve the high quality levels of conventional solvent-based coatings. One problem which remains is the sometimes unsatisfactory application results when using colour- and/or special effect-imparting water-borne base coats. In particular, when applying special effect water-borne base coats, formation of the metallic effect may be inadequate.

Another factor is that in vehicle repair coating, it is often only parts of an automotive body or relatively small blemished areas within a vehicle component which need to be coated. It is important in such cases to coat the vehicle part or blemished area in such a manner that there are no differences in colour shade or special effect or any other optically perceptible differences relative to the surrounding existing coating. When applying special effect-imparting water-borne base coats, completely satisfactory blending-in results very often cannot be achieved in the transitional zone to the existing coating.

Various blending-in methods have already been developed. WO-A-95/14540 (U.S. Pat. No. 5,871,809) accordingly describes a repair coating process which is intended to avoid clouding in particular in water-based special effect coatings. The water-borne base coat is applied in two spray passes, preferably, without an intermediate flash-off time between the spray passes, in each case until a boundary of the existing coating is reached. This procedure is repeated until the entire part to be coated is provided with the base coat.

EP-A-719 185 describes a repair coating process by means of blending-in, in which an opaque coat of an aqueous base coat is applied onto the blemished area in single spray pass and, when applying the base coat onto the areas of the existing coating bordering the blemished area, the spray gun is inclined obliquely towards the blemished area and a normal or moderately reduced spray gun input pressure is used.

Using known blending-in processes, it has not hitherto been possible to achieve satisfactory blending-in results with special effect water-borne base coats. Either the finisher is given only a very narrow application window for achieving acceptable coating results or the coating results themselves remain unsatisfactory and the transition from the repaired blemished area to the surrounding areas is optically perceptible.

There is accordingly a requirement for processes for multilayer repair coating with water-borne base coats, in particular for blending-in with special effect water-borne base coats, which, on the one hand, achieve very good blending-in results while being easy to handle and which, on the other hand, also ensure good reproducibility even under different application conditions and on different vehicle geometries.

SUMMARY OF THE INVENTION

The invention relates to a process for multilayer repair coating, in particular, for multilayer vehicle repair coating by means of blending-in using water-borne base coats containing special effect pigments comprising the following steps:
1. optionally, preparing a blemished area to be repaired,
2. applying a first base coat layer of a conventional, water-borne base coat I containing at least one special effect pigment onto the blemished area to be repaired,
3. applying a second base coat layer of a water-borne base coat II onto the resultant coating, wherein the water-borne base coat II for producing the second base coat layer is feathered out into the zones bordering the repair coating, and wherein this water-borne base coat II comprises
   A) at least one water-dilutable binder,
   B) at least one special effect pigment,
   C) at least one matting agent,
   D) water and
   E) optionally, additional conventional coating additives and/or organic solvents,
   with the proviso that the water-borne base coat II contains the at least one special effect pigment in a quantity of 25-75 wt. %, preferably of 35-65 wt. % and particularly preferably of 40-60 wt. %, relative to the quantity of the at least one special effect pigment contained in water-borne base coat I,
4. applying a clear coat layer of a transparent clear coat onto the resultant coating of water-borne base coat, and
5. curing the coating applied in this manner.

It has surprisingly been found that optically perfect coatings are obtained with the repair coating process according to the invention, which coatings exhibit no visual differences relative to the surrounding existing coating. The good coating results may here be achieved irrespective of ambient conditions during application, for example, in particular atmospheric humidity and temperature.

DETAILED DESCRIPTION OF THE EMBODIMENTS

The process according to the invention will be explained in greater detail below.

The water-borne base coats I and II containing at least one special effect pigment comprise water-based coating compositions. Water-based coating compositions are coating compositions, wherein water is used as thinner, optionally in combination with relatively small amounts of organic solvents, when preparing and/or applying the coating composition.

Wt. % shall mean percent by weight.

Where necessary, the blemished area to be repaired on the vehicle or vehicle part to be coated is prepared in conventional manner in step 1 of the process according to the invention. The blemished area may, for example, be prepared by cleaning, sanding, recleaning and applying a putty, primer and/or primer surfacer material. The putty, primer and/or primer surfacer material may comprise conventional coating compositions, as are used by the person skilled in the art as putty, primer and/or primer surfacer in vehicle repair coating. The materials to be used may be solvent-based or water-based. They may be cured in conventional manner, for example, at 20 to 60° C. and/or by radiating with UV radiation.

The blemished area prepared in this manner and optionally also the bordering transition zone between the blemished area and intact existing coating may then be sanded and the sanded repair surface cleaned with conventional cleaning agents, for example, silicone remover.

In step 2 of the process according to the invention, a conventional water-borne base coat I containing at least one special effect pigment is applied onto the area to be repaired which has been prepared in this manner. The water-borne base coat may, however, also be applied onto a cured existing or original coating which is still intact.

Application proceeds by adjusting the prepared coating material to a conventional spraying viscosity and applying it in conventional manner onto the repair surface. The spraying viscosity here depends upon the coating material used, but is generally within a certain tolerance range which permits proper processing/application of the coating material by spray application. Spraying viscosity is generally stated in seconds, determined to DIN EN ISO 2431, DIN 4 cup/20° C. For water-borne base coats, it may be, for example, 18 s to 26 s.

The water-borne base coats I containing the at least one special effect pigment comprise water-borne base coats pigmented with special effect pigments which are known to the person skilled in the art and are conventional for vehicle repair coating.

The water-borne base coats I to be applied conventionally contain
 a) at least one water-dilutable, film-forming binder,
 b) at least one special effect pigment,
 c) water and
 d) optionally, conventional coating additives and/or organic solvents.

The water-dilutable binders a) may, for example, comprise those based on water-dilutable polyurethane, polyacrylate, polyester and/or alkyd resins. Hybrid polymers, for example, acrylated polyesters or acrylated polyurethanes, or seed polymers, for example, polyacrylate resins produced in the presence of polyesters and/or polyurethanes may also be used.

The binder may be physically drying and/or chemically crosslinking by means of addition polymerisation, polycondensation or polyaddition reactions. Chemically crosslinkable binder systems contain appropriate crosslinkable functional groups. Suitable functional groups are, for example, hydroxyl groups, isocyanate groups, acetoacetyl groups, unsaturated groups, for example, (meth)acryloyl groups, epoxy groups and amino groups. Crosslinking agents with appropriate, complementarily reactive functional groups may be present for the purpose of crosslinking. If chemically crosslinkable binders are used, binders containing hydroxyl groups and polyisocyanate crosslinking agents are preferred.

The coating compositions may contain further resins, for example, cellulose esters, such as, cellulose acetobutyrate, and/or melamine resins. Binders based on polyurethane and/or (meth)acrylate resins are preferably used.

In order to ensure sufficient water dilutability of the binders, these must be used in water-dilutable form. This may be achieved in the manner known to the person skilled in the art by ionic and/or nonionic modification of the binders. Anionic and/or nonionic modification is preferred. Anionic modification may, for example, be achieved by incorporating carboxyl groups and at least partially neutralising them. Suitable neutralising agents are basic compounds such as, tertiary amines, for example, triethylamine, dimethylethanolamine, diethylethanolamine. Nonionic modification may, for example, be achieved by incorporating polyethylene oxide units. In addition to or instead of the above-stated possibilities, it is also possible to use external emulsifiers in order to ensure the required water-dilutability.

The binders listed above are stated merely by way of example. The binder may also be further modified and be combined with one another at will. No particular restrictions apply to the binders which may be used. Any binders known to the person skilled in the art and in particular, conventional in the vehicle repair coating sector for formulating water-borne base coats may be used.

The water-borne base coats I contain at least one special effect pigment. The special effect pigments are intended to impart to the coated substrate surface a specific visual effect, for example, a light-dark flop, a colour flop or other similar effect. Examples of usable special effect pigments are metal pigments in flake form, for example, made from aluminium or copper, interference pigments, such as, for example, metal oxide coated metal pigments, for example, aluminium coated with titanium dioxide, iron oxide or mixed oxide, coated mica, such as, for example, mica coated with titanium dioxide and/or with further metal oxides, for example, $Fe_2O_3$ and/or $Cr_2O_3$, iron oxide in flake form and graphite pigments.

The water-borne base coats I contain the special effect pigments in the quantities familiar to the person skilled in the art for the intended application. Special effect pigments may, for example, be present in an amount of 0.8 to 13.0 wt. %, relative to the complete coating composition. The specific quantity to be used here depends, for example, on the type of pigment used, but also on the effect which it is desired to achieve.

Apart from the special effect pigments, the water-borne base coats I may also contain colour-imparting pigments. Suitable colour-imparting pigments are any conventional coating pigments of an organic or inorganic nature. Examples of inorganic or organic colouring pigments are titanium dioxide, micronized titanium dioxide, iron oxide pigments, carbon black, azo pigments, phthalocyanine pigments, quinacridone or perylene or pyrrolopyrrole pigments. Soluble dyes and/or transparent pigments may optionally also be present.

The water-borne base coats I contain furthermore water and optionally, organic solvents and/or conventional coating additives.

The organic solvents comprise conventional coating solvents. These may originate from the preparation of the binders or may be added separately. Examples of suitable solvents are mono- or polyhydric alcohols, for example, propanol, butanol, hexanol; glycol ethers or esters, for example, diethylene glycol dialkyl ethers, dipropylene glycol dialkyl ethers, in each case with C1 to C6 alkyl, ethoxypropanol, ethylene glycol monobutyl ether; glycols, for example, ethylene glycol, propylene glycol, N-methylpyrrolidone as well as ketones, for example, methyl ethyl ketone, acetone, cyclohexanone; aromatic or aliphatic hydrocarbons, for example, toluene, xylene or linear or branched aliphatic C6-C12 hydrocarbons.

If organic solvents are used, they preferably comprise water-miscible organic solvents.

Examples of conventional coating additives which may be used include levelling agents, rheological agents, thickeners, such as, polyacrylate thickeners containing carboxyl groups or associative thickeners based on polyurethane, microgels, defoamers, wetting agents, anticratering agents, adhesion promoters and curing accelerators. The additives are used in conventional amounts known to the person skilled in the art.

Paste resins, preferably water-dilutable paste resins, for example, based on polyurethane or acrylate resin, may also be used in the water-borne base coats for grinding the pigments or for producing pigment pastes.

The water-borne base coats I may, for example, have a (solid) binder fraction of 10 to 30 wt. %, a water content of 55-85 wt. % and an organic solvent fraction of up to at most 10-15 wt. %, in each case relative to the complete coating composition. The solids content of the coating may here, for example, amount to 15-30 wt. % and the pigment/binder ratio to 4.0 to 86.0 (relative to 100 g of solid binder, i.e., amount pigment: amount binder ×100).

The water-borne base coats I are applied onto the repair surface in conventional manner, preferably by means of spray application, to a final dry film thickness of, for example, around 15-35 μm. Application may advantageously proceed in two or more spray passes, which are themselves already somewhat feathered out.

According to step 3 of the process according to the invention, a second water-borne base coat II containing at least one special effect pigment is then applied onto the coating obtained in the above manner, optionally, with an intermediate flash-off phase of, for example, 1-5 minutes at room temperature, optionally, using air blowing jets or guns. The water-borne base coat II may here then be applied wet-on-wet onto the optionally flashed off base coat layer of the water-borne base coat I or alternatively, after drying or curing of the first base coat layer, for example, at room temperature or forced at higher temperatures, for example, of up to 80° C., preferably, at 40 to 60° C. Wet-on-wet application is preferred here. Application advantageously here also proceeds in two or more spray passes, the blemished area being coated with feathering out into the adjacent intact existing coating. The bordering intact existing coating is generally an intact clear coating, which has optionally been appropriately prepared. The person skilled in the art knows how feathering out into the bordering areas is to be performed in the workshop. It is, for example, conventionally possible to use a reduced spray gun inlet pressure, for example, of 0.8-1.5 bar.

As has already been stated above, the special effect-imparting water-borne base coat II comprises at least one water-dilutable binder A), at least one special effect pigment B), at least one matting agent C), water and optionally, additional conventional coating additives and/or organic solvents.

The water-dilutable binders A) comprise conventional binders familiar to the person skilled in the art, as have already been described above in the explanations relating to water-borne base coat I. The water-dilutable binders used in water-borne base coat II are preferably the same as those used in water-borne base coat I.

The special effect pigments B) comprise conventional special effect pigments familiar to the person skilled in the art, as have already been described in the explanations relating to water-borne base coat I. The special effect pigments used in water-borne base coat II are preferably the same as those used in water-borne base coat I. It is, however, essential that the water-borne base coat II contains the special effect pigments in a quantity of 25-75 wt. %, preferably of 35-65 wt. % and particularly preferably of 40-60 wt. %, relative to the quantity of the at least one special effect pigment contained in water-borne base coat I. If, in addition to the special effect pigments, the water-borne base coat II contains colour-imparting pigments, these should then also correspondingly be present in water-borne base coat II in a quantity of 25-75 wt. %, preferably of 35-65 wt. % and particularly preferably of 40-60 wt. %, relative to the quantity of the colour-imparting pigments contained in water-borne base coat I. In principle, water-borne base coat II comprises the same type of pigments as those used in pigmenting water-borne base coat I.

Water-borne base coat II contains at least one matting agent C) as an essential constituent. The matting agents C) comprise substances familiar to the person skilled in the art and known as matting agents, which are also commercially obtainable.

The matting agent may be inorganic or organic in nature. Examples of inorganic matting agents are various silicas, such as, precipitated silica and fumed silica, silica gels and phyllosilicates, for example, hydrated magnesium silicate (talcum), alumina and calcium carbonate. The inorganic matting agents may be present in untreated form or in a treated form, e.g., surface-treated with organic compounds, for example, treated with suitable grades of wax, or also with inorganic compounds. Examples of organic matting agents are Al, Zn, Ca or Mg stearate, waxy compounds, such as, for example, micronized polypropylene waxes, as well as variuous urea/formaldehyde condensation products.

Typically, matting agents are particulate materials with average particle sizes in the range of for example, 3-12 microns.

Preferably, urea/formaldehyde condensation products and/or silica based matting agents can be used. Examples of suitable urea/formaldehyde condensation products include Pergopak® M4 from Albemarle Corporation (mean particle size 5-7 μm). Examples of suitable silica based matting agents include Syloid® 7000, Syloid® C-907 (a synthetic amorphous silica wherein the surface is treated with a hydrocarbon-type wax) from W.R. Grace of Maryland and TS-100 and ACE-MATT® OK 412 from Degussa.

The water-borne base coat II preferably contains 0.01 to 3.0 wt. %, particularly preferably 0.03 to 2.0 wt. % and in particular 0.1 to 1.5 wt. % of matting agent C), relative to the complete coating composition.

The water-borne base coat II furthermore contains water and optionally, additional conventional coating additives and/or organic solvents. Reference is made to the description of water-borne base coat I with regard to the quantities of these components to be used and to the kind of additives and organic solvents to be used. The binder content in water-borne base coat II may also match that in water-borne base coat I.

It is particularly advantageous if the water-borne base coat II substantially matches the composition of water-borne base coat I. It must, however, be ensured that the above-stated condition regarding the effective pigment concentration in water-borne base coat II is met and that the stated matting agents are present in the stated quantities.

Providing that water-borne base coat II substantially matches the composition of water-borne base coat I, water-borne base coat II may relatively straightforwardly be produced using water-borne base coat I. Water-borne base coat II may preferably be obtained by mixing water-borne base coat I with a suitably adapted blend-in additive. Water-borne base coat I may here be any desired special effect water-borne base coat, as is, for example, conventionally obtained in vehicle repair coating by base formulation or by mixing different mixing paints and/or tinting components. The mixing paints and tinting components may, for example, be a constituent of a mixing system typically used in vehicle repair coating for producing water-borne base coats which match accurately with regard to shade or special effect. The water-borne base coat II to be applied in step 3 may then be produced as the basis of the same mixed paint or the same ready blended paint as was applied in step 2 of the process. The blend-in additive to be used for producing water-borne base coat II may here be provided as a constituent of the paint mixing system. The blend-in additive is preferably free of special effect pigments and colouring pigments and contains a1) at least one water-dilutable binder,
a2) at least one matting agent and
a3) water and optionally, organic solvents and/or additional conventional coating additives.

The water-borne base coat II is then produced by mixing water-borne base coat I and the blend-in additive with one another in a mixing ratio such that the quantity of the special effect pigments in water-borne base coat II corresponds to the above-stated predetermined quantity of special effect pigments. The two components may, for example, be mixed with one another in a mixing ratio of water-borne base coat I to blend-in additive of 1:2 to 2:1, relative to weight. The composition of the blend-in additive may here vary within a range such that the blend-in additive is, on the one hand, readily miscible with the water-borne base coat I and, on the other hand, taking account of the mixing ratio of water-borne base coat I to blend-in additive, water-borne base coat II contains the desired quantities of matting agent. The blend-in additive may preferably contain 5.00 to 40.00 wt. % of water-dilutable binder a1), 0.01 to 4.0 wt. % of matting agent a2) and 60-90 wt. % of the further components a3), wherein the weight percentages of components a1) to a3) add up to 100 wt. %. In particular, the blend-in additive may contain 5.00 to 40.00 wt. %, preferably 10 to 30 wt. % of water-dilutable binder a1), 0.01 to 4.0, preferably 0.05 to 3.00 wt. % of matting agent a2) and 50-90 wt. %, preferably 60-80 wt. % of water and 0 to 20 wt. %, preferably 5 to 15 wt. % of organic solvents, wherein the sum of the weight percentages of the stated components adds up 100 wt. %. Additional conventional coating additives, such as, for example, thickeners, defoamers and the like, may optionally also be present in the blend-in additive in quantities of for example, 0.1 to 5.0 wt. %, relative to the entire quantity of blend-in additive.

The water-dilutable binders a1) comprise those binders as have been described above in the explanations relating to water-borne base coat I. One or more of the water-dilutable binders, for example, based on polyurethane and/or (meth) acrylate resin, present in water-borne base coat I is/are preferably used in the blend-in additive. The matting agent and additional optional conventional coating additives and organic solvents present in the blend-in additive comprise those as have already been described in the explanations relating to water-borne base coats I and II.

Water-borne base coat II may be produced by simple means, for example, by manual mixing, from the appropriate quantities of water-borne base coat I and blend-in additive.

Water-borne base coat II is applied, for example, to a final dry film thickness of approx. 5-15 μm. The base coat layer may be separately cured, optionally, after a flash-off phase, at temperatures of from room temperature to approx. 80° C., preferably at 20° C. to 60° C. It may, however, also be cured together with the underlying base coat layer of water-borne base coat I.

In accordance with step 4 of the process according to the invention, a clear coat may then be applied onto the dried or cured base coat. It is, however, preferred to apply the clear coat, optionally, after a brief flash-off phase, directly onto the base coat (without drying or curing of the latter) and then to cure the coating structure at the above-stated temperatures. Water-borne base coat II is preferably applied onto water-borne base coat layer I and the clear coat onto water-borne base coat layer II without intermediate drying or intermediate curing and then all 3 coating layers are cured together at room temperature up to approx. 80° C., preferably at 20 to 60° C.

The clear coat may comprise any desired water-based or solvent-based clear coat. In particular, they comprise two-component clear coats based on chemically crosslinking binders, for example, based on hydroxy-functional binder components and polyisocyanate crosslinking agents.

Hydroxy-functional binders which may be considered are any polyesters, polyethers, polyurethanes and (meth)acrylic copolymers known from polyurethane chemistry which contain hydroxyl groups and which may each be used individually or in combination with one another. The OH—functional binders may also be used in the form of hybrids, for example, as (meth)acrylated polyurethanes, (meth)acrylated polyesters and/or poly(meth)acrylate/polyester seed polymers. Polyisocyanates which may be considered are any desired organic polyisocyanates, preferably diisocyanates, known to the person skilled in the art.

If aqueous clear coats are used, sufficient water dilutability of the binder in the aqueous coating compositions must be ensured. To this end, as has already been explained above, the binders may be converted into a water-dilutable form in the manner known to the person skilled by ionic and/or nonionic modification.

UV clear coats based on free-radically and/or cationically polymerizable binders may likewise be used, curing of which is performed by means of UV radiation.

The clear coats may also contain conventional coating additives.

Using the process according to the invention, it is possible to achieve extraordinarily good blending-in results, even with critical colour shades and on different vehicle geometries. Even when repair coating a blemished area within a larger surface, for example, on the motor hood or roof of a vehicle, such a repair constituting a particular challenge, no optical differences relative to the surrounding existing coating are discernible.

The following Examples are intended to illustrate the invention in greater detail.

EXAMPLES

A motor hood provided with a damaged area of approx. 40×40 cm was spot repaired according to the invention. The damaged area (intact primer surfacer coating of an old finish) was sanded and cleaned with waterborne silicone remover.

A water-based, commercial base coat (Standohyd® base coat MB 744 Brilliant Silver Metallic; Standox GmbH) was applied onto the pretreated damaged area in 5 spray passes using a spray gun inlet pressure (SATA jet 2000 HVLP; WSB nozzel) of approx 0.8 bar.

Then a second water-based base coat has been prepared by mixing the water-based, commercial base coat mentioned above with the spot repair additive (as described below) in a ratio by weight of 1:1.

Spot Repair Additive

A spot repair additive has been prepared by mixing the following components:

36.5% by weight of a water dilutable polyurethan dispersion (prepared according to EP 0 661 321, preparation example 1, polyurethane dispersion A )

16.8% by weight of a waterdilutable polyurethane dispersion (prepared according to EP 0 661 321, preparation example 2, polyurethane dispersion B)

1.2% by weight of a matting agent based on a urea methanal condensate (Pergopak® M4 from Albemarle Corporation)

0.1% by weight of a commercial antifoaming agent (Tego Foamex® 805 from Degussa)

1.4% by weight of commercial thickener (Additol® VXW 1312)

0.08% by weight of dimethyl ethanol amine (95% in water)

37.12% by weight of water 6.8% by weight of butyl glycol

After an intermediate flash-off time of 5 minutes at 20° C., the so prepared second water-based base coat was applied in 2 spray passes at a spray gun inlet pressure of approx. 0.8 bar onto the base coat layer applied in step 1 and into the transition zone/fade out zone.

After a final flash-off time of 10 minutes at 20° C., a commercial two-component solvent-based clear coat (Standocryl® VOC HighPro Klarlack, Standox® HighPro Hardener 30, Standox GmbH) was applied onto the entire fender and, after a flash-off time of 10 minutes at 20° C., the entire coating was cured for 30 minutes at 60° C.

An excellent blending-in result was obtained. There were no discernible optical differences between the coated repair area and the surrounding existing coating.

What is claimed is:

1. A process for multilayer vehicle repair coating comprising the following steps:
   1. optionally, preparing a blemished area to be repaired,
   2. applying a first base coat layer of a conventional, water-borne base coat I containing at least one special effect pigment onto the blemished area to be repaired,
   3. applying a second base coat layer of a water-borne base coat II onto the resultant coating, wherein the water-borne base coat II for producing the second base coat layer is feathered out into the zones bordering the repair coating, and wherein this water-borne base coat II comprises
      A) at least one water-dilutable binder,
      B) at least one special effect pigment,
      C) at least one mailing agent,
      D) water and
      E) optionally, additional conventional coating additives and/or organic solvents,
   with the proviso that the water-borne base coat II contains the at least one special effect pigment in a quantity of 25-75 wt. %, relative to the quantity of the at least one special effect pigment contained in water-borne base coat I, and wherein the water-borne base coat II obtained by mixing the water-borne base coat I and a blend-in additive contains:
      a1) at least one water-dilutable binder,
      a2) at least one matting agent,
      a3) water and optionally, organic solvents and/or additional conventional coating additives,
   4. applying a clear coat layer of a transparent clear coat onto the resultant coating of water-borne base coat, and
   5. curing the coating applied in this manner.

2. The process according to claim 1, wherein water-borne base coat II contains 0.01 to 3.00 wt. % of the at least one matting agent C), relative to the entire quantity of water-borne base coat II.

3. The process according to claim 1, wherein water-borne base coat II contains 0.03 to 2.00 wt. % of the at least one matting agent C), relative to the entire quantity of water-borne base coat II.

4. The process according to claim 1, wherein water-borne base coat II contains the at least one special effect pigment in a quantity of 35-85 wt. %, relative to the quantity of the at least one special effect pigment contained in water-borne base coat I.

5. The process according to claim 1, wherein water-borne base coat I comprises:
   a) at least one water-dilutable, film-forming binder,
   b) at least one special effect pigment,
   c) water,
   d) optionally, conventional coating additives and/or organic solvents.

6. The process according to claim 5, wherein the water-dilutable binders a) comprise water-dilutable polyurethane and/or (meth)acrylate resins.

7. The process according to claim 1, wherein water-borne base coat I contains 1.0 to 13.0 wt. % of the at least one special effect pigment, relative to the complete coating composition.

8. The process according to claim 1, wherein the water-dilutable binders A) comprise water-dilutable polyurethane and/or (meth)acrylate resins.

9. The process according to claim 1, wherein the matting agents C) comprise urea/formaldehyde condensation products and/or silicon dioxide-based matting agents.

10. The process according to claim 1, wherein the matting agents a2) comprise urea/formaldehyde condensation products and/or silicon dioxide-based matting agents.

11. The process according to claim 1, wherein the water-borne base coat II is obtained by mixing water-borne base coat I and a blend-in additive, which contains
   a1) 5.00 to 40.00 wt. % of at least one water-dilutable binder,
   a2) 0.01 to 4.00 wt. % of at least one matting agent and
   a3) 60 to 90 wt. % of water and optionally, organic solvents and/or additional conventional coating additives, wherein the weight percentages of components a) to c) add up to 100 wt. %,
in a mixing ratio such that water-borne base coat II contains the at least one special effect pigment in a quantity of 25-75 wt. %, relative to the quantity of the at least one special effect pigment contained in water-borne base coat I.

12. The process according to claim 11, wherein the water-borne base coat II is obtained by mixing water-borne base coat II and the blend-in additive in a mixing ratio of 1:2 to 2:1, relative to weight.

13. The process according to claim 1, wherein the blend-in additive contains 5.00 to 40.00 wt. % of the at least one water-dilutable binder a1), 0.01 to 4.00 wt. % of the at least one matting agent a2), 50 to 90 wt. % of water and 0-20 wt. % of organic solvents, wherein the weight percentages of the components add up 100 wt. %.

14. The process according to claim 1, water-borne base coat II is applied in step 3 onto water-borne base coat I after a flash-off phase, without intermediate curing or intermediate drying.

15. The process according to claim 1, wherein the clear coat is applied in step 4 onto water-borne base coat II after a flash-off phase, without intermediate curing or intermediate drying.

16. The process according to claim 1, wherein the coatings applied in steps 2, 3 and 4 are jointly cured in step 5 at 20 to 80° C.

17. The process according to claim 1, wherein it comprises a vehicle repair process for blending-in.

* * * * *